US007729725B2

(12) United States Patent
Stenmark

(10) Patent No.: US 7,729,725 B2
(45) Date of Patent: Jun. 1, 2010

(54) METHODS, ELECTRONIC DEVICES AND COMPUTER PROGRAM PRODUCTS FOR TRANSFERRING DATA STORED IN AN ELECTRONIC DEVICE WHEN A SUBSCRIBER IDENTITY MODULE IS ABSENT THEREFROM

(75) Inventor: Fredrik Stenmark, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1063 days.

(21) Appl. No.: 10/617,325

(22) Filed: Jul. 10, 2003

(65) Prior Publication Data

US 2005/0009563 A1 Jan. 13, 2005

(51) Int. Cl.
*H04M 1/00* (2006.01)

(52) U.S. Cl. .................. 455/558; 455/556.1; 455/556.2; 455/575; 379/322; 235/475

(58) Field of Classification Search .................. 455/558, 455/556.1, 556.2, 566, 575; 379/322, 331; 235/475, 380
See application file for complete search history.

(56) References Cited

U.S. PATENT DOCUMENTS

| 5,748,720 A * | 5/1998 | Loder ......................... 455/406 |
| 6,246,376 B1 * | 6/2001 | Bork et al. .................. 343/760 |
| 6,480,725 B2 * | 11/2002 | Cassidy et al. .............. 455/558 |
| 6,907,264 B1 * | 6/2005 | Sterkel ..................... 455/556.1 |
| 6,957,060 B1 * | 10/2005 | Sharp ......................... 455/410 |
| 7,171,221 B1 * | 1/2007 | Amin et al. ................. 455/462 |

(Continued)

FOREIGN PATENT DOCUMENTS

CN 1300509 A 6/2001

(Continued)

OTHER PUBLICATIONS

Sherrer et al. "Sprint Signs Agreement with Sony Ericsson for Exclusive Distribution of the First CDMA Mobile Phone Featuring Integrated Bluetooth Technology" *Sprint News Releases* 1 page <http://www2.sprint.com/mr/news_dtl.do?page=print&id=1620> Accessed on Sep. 19, 2005.

(Continued)

*Primary Examiner*—Minh D Dao
(74) *Attorney, Agent, or Firm*—Myers Bigel Sibley & Sajovec, P.A.

(57) ABSTRACT

The invention can allow data to be transferred from/to an electronic device when a removable Subscriber Identity Module (SIM) card that stores information used to register the electronic device with a communications network is absent from the electronic device. A subscriber may, therefore, upgrade from an existing radiotelephone to a new radiotelephone without the need for two SIM cards so that both radiotelephones operate to transfer the data. For example, according to embodiments of the invention, a subscriber can transfer data from the existing radiotelephone to the new radiotelephone even though one of the radiotelephones does not have a SIM card.

36 Claims, 9 Drawing Sheets

U.S. PATENT DOCUMENTS

| | | | | |
|---|---|---|---|---|
| 2002/0177410 | A1* | 11/2002 | Klein et al. | 455/41 |
| 2003/0017843 | A1* | 1/2003 | Noblins | 455/553 |
| 2003/0073456 | A1 | 4/2003 | Griffin et al. | |
| 2003/0093547 | A1* | 5/2003 | Scheessele | 709/231 |
| 2004/0199914 | A1* | 10/2004 | Aerrabotu et al. | 718/100 |

FOREIGN PATENT DOCUMENTS

| | | |
|---|---|---|
| DE | 100 12 057 | 9/2001 |
| DE | 100 54 944 | 5/2002 |
| DE | 101 00 824 | 7/2002 |
| EP | 1 128 692 | 8/2001 |
| GB | 2 365 699 A | 2/2002 |
| WO | WO 99/43136 | 8/1999 |
| WO | WO 00/31994 | 6/2000 |

OTHER PUBLICATIONS

Sony Ericsson *Developer News: May '03 Archive* 12 pages <http://www.sonyericsson.com/newsletter/developer/newsletter_archive_03_05.jsp> accessed on Aug. 11, 2003.

International Search Report and The Written Opinion of the International Searching Authority for International patent application No. PCT/EP2004/006056 mailed on Feb. 21, 2005.

Office Action for European Patent Application No. 04 739 608, mailed Jun. 1, 2007.

English Translation of Chinese Office Action from corresponding Chinese Patent Application No. 200480025838 (15 pages); Issue Date: Jun. 6, 2008.

* cited by examiner

METHODS, ELECTRONIC DEVICES AND COMPUTER PROGRAM PRODUCTS FOR TRANSFERRING DATA STORED IN AN ELECTRONIC DEVICE WHEN A SUBSCRIBER IDENTITY MODULE IS ABSENT THEREFROM

TECHNICAL FIELD OF THE INVENTION

The invention generally relates to the field of electronics and, more particularly, to methods, electronic devices and computer program products for electronic communications.

DESCRIPTION OF RELATED ART

Mobile cellular radiotelephones used in many communications networks include a removable Subscriber Identity Module (SIM) card. The SIM card can store information that identifies a subscriber to service provided by the communications network. The radiotelephone can use the information stored on the SIM card to register with the communications network so that service can be provided when, for example, the radiotelephone is turned on. It is also known to store other types of information, such as contact information, in the radiotelephone.

As new services and products for wireless communications are introduced, subscribers may wish to upgrade their service more frequently. For example, when a new type of radiotelephone is introduced, subscribers may wish to "upgrade" from their existing radiotelephone to the new radiotelephone. The upgrade can be facilitated by allowing the subscriber to remove the SIM card from the existing radiotelephone and insert the SIM card into the new radiotelephone. The information on the SIM card can, therefore, be "migrated" to the new radiotelephone, which can then register with the communications system, using the SIM card, so that the subscriber continues to receive service from the network using the new radiotelephone.

Notwithstanding the foregoing, there is a need to improve the process of upgrading to a new radiotelephone and migrating information from an existing radiotelephone to a new radiotelephone.

SUMMARY

Embodiments according to the invention can allow data to be transferred from/to an electronic device when a removable Subscriber Identity Module (SIM) card that stores information used to register the electronic device with a wireless communications network is absent from the electronic device. A subscriber may, therefore, upgrade from an existing radiotelephone to a new radiotelephone without the need for two SIM cards so that both radiotelephones operate to transfer the data. For example, according to embodiments of the invention, a subscriber can transfer data from the existing radiotelephone to the new radiotelephone even though one of the radiotelephones does not have a SIM card. Data, such as contact information, that is not stored on the SIM card may, therefore, be more easily migrated to the new radiotelephone.

In some embodiments according to the invention, a determination can be made whether the SIM is absent from the electronic device and a determination can be made if a transfer mode is enabled to allow transferring data while the SIM is absent from the electronic device. In some embodiments according to the invention, data is transferred if the transfer mode is enabled and blocked if the transfer mode is disabled.

In some embodiments according to the invention, determining if a transfer mode is enabled can include requesting input to the electronic device and receiving input to the electronic device via an input device associated with the electronic device. A determination can be made as to whether the received input enables transfer mode.

In some embodiments according to the invention, the data can be transferred using a first communications channel that is separate from a second communications channel used to register the electronic device with the communications network. In some embodiments according to the invention, the first communications channel can be carried over at least one of an infrared communications link, a BlueTooth communications link, and an IEEE 802.11 communications link.

In some embodiments according to the invention, the electronic device can be a mobile cellular radiotelephone configured to register in a Global System for Mobile telecommunications compliant communications network. In some embodiments according to the invention, a determination can be made, in the first electronic device, that the SIM is absent therefrom and a determination can be made whether a transfer mode is enabled for the first electronic device to allow the transfer of data from/to a second electronic device while the SIM is absent. Data can be transferred from the first electronic device, or received from the second electronic device, responsive to determining that the transfer mode is enabled for the first electronic device.

In some embodiments according to the invention, a second SIM that stores information used to register a second electronic device with the communications network is absent from the second electronic device while transferring data. In some embodiments according to the invention, the data can be transferred while a SIM that stores information other than that used to register the electronic device with the communications network is present in the electronic device. In some embodiments according to the invention, the data can be data stored in non-volatile memory of the electronic device.

In some embodiments according to the invention, the data can be at least one of contact information, schedule information, to-do information, e-mail information, web information, image information, audio information, and video information. In some embodiments according to the invention, the data can be excess data having a size that exceeds an unused storage capacity of the SIM card. In some embodiments according to the invention, the electronic device can be a unitary mobile cellular radiotelephone.

In some embodiments according to the invention, a processor circuit can be configured to allow transfer of user selectable data from a memory of an electronic device to an output therefrom when a removable Subscriber Identity Module (SIM) that stores information used to register the electronic device with a wireless communications network is absent from the electronic device.

In some embodiments according to the invention, the user selectable data can be at least one of audio information transferred to headphones coupled to the electronic device and video or image data transferred to a display of the electronic device that is selected by a user.

DESCRIPTION OF EMBODIMENTS ACCORDING TO THE INVENTION

Figure 1:
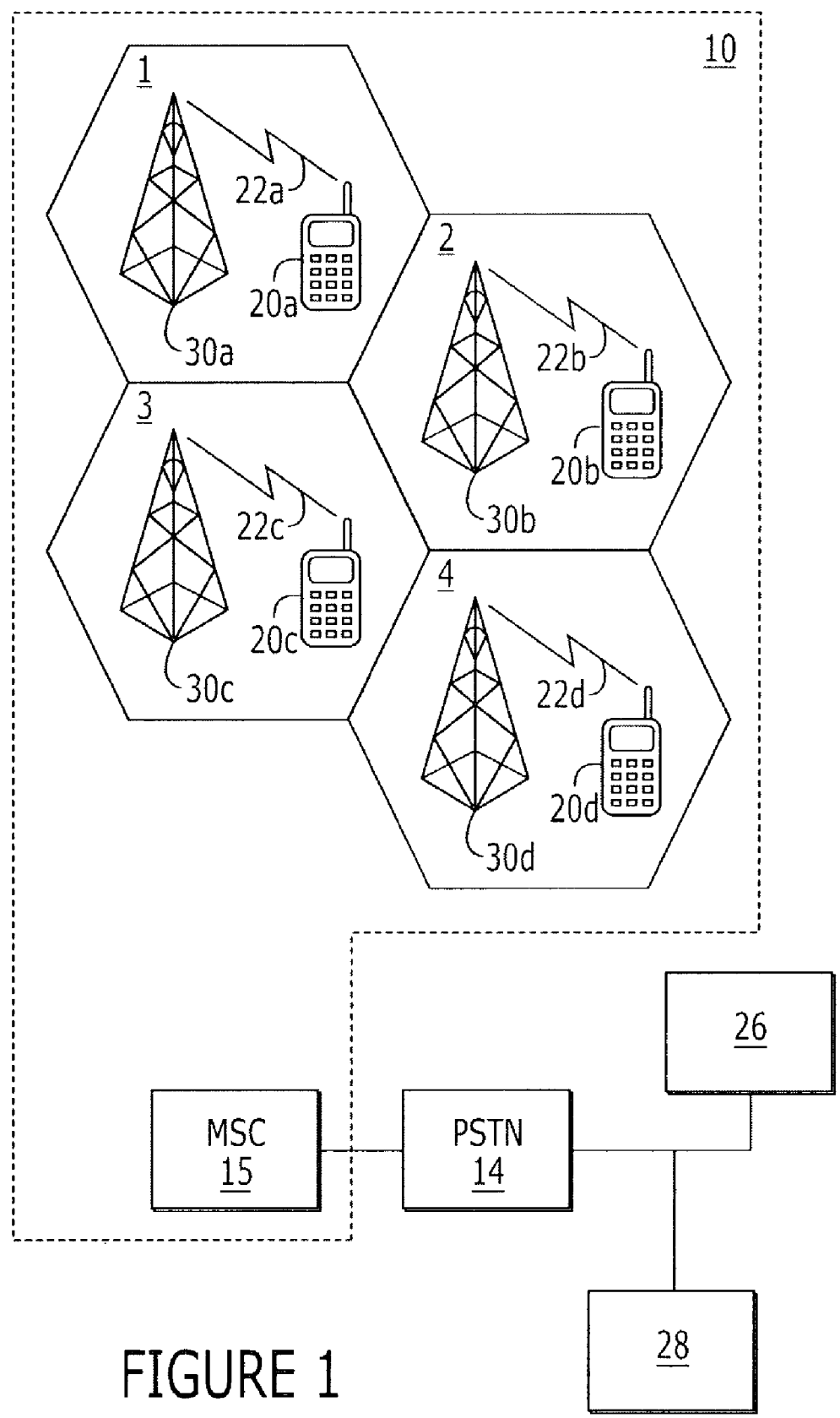
FIG. 1 is a block diagram illustrating wireless communications networks utilizing embodiments of mobile cellular radiotelephones according to the invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The invention is described with reference to flowcharts and block diagrams of mobile cellular radiotelephones, communications networks, and operations thereof according to embodiments of the invention. It will be understood that each block of the flowcharts and/or block diagrams, and combinations of blocks, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or schematic block or blocks.

The invention is generally described herein in the context of radiotelephones and networks that comply with the Global Standard for Mobile (GSM) communications standard using, for example, Time Division Multiple Access (TDMA) type communications as is well known to those skilled in the art. It will be understood, however, that the invention can be utilized in other types of systems which use removable Subscriber Identify Module (SIM) cards. It will be understood that a SIM card, as used herein, can include any removable memory device that stores information used to register the electronic device with a wireless communications network, such as a flash memory card, a smart card, or other type of removable non-volatile storage device.

GSM systems can be implemented as TDMA by subdividing the frequency bands employed in conventional Frequency Division Multiple Access (FDMA) systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, General Packet Radio Service (GPRS), enhanced data rates for GSM evolution (EDGE), and the European GSM standard, which divides each of its frequency bands into 8 time slots (or burst periods) which define a frame. In these TDMA systems, each user can communicate with the network using bursts of digital data transmitted during the user's assigned time slots. TDMA type communications are described further, for example, in *The Mobile Communications Handbook*, Jerry D. Gibson, CRC Press, 1996.

Embodiments according to the invention can also be practiced in communications networks that provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA) or other types of systems that use removable SIM cards to register with a network.

The invention may also be used in celestial communications systems, such as satellite communications systems. The celestial wireless communication system may be employed to perform similar functions to those performed by the communications network 10 of FIG. 1. In particular, the celestial wireless communication system typically includes one or more satellites that serve as relays or transponders between one or more earth stations and (satellite) radiotelephones. The satellites typically communicate with the satellite radiotelephones and earth stations via duplex communication links. Each earth station may, in turn, be connected to the PSTN 14 (and to terrestrial communications networks 10), thereby allowing communications between the satellite radiotelephones, terminals 28, 26, and radiotelephones 20*a-d*.

The celestial wireless communication system may utilize a single antenna beam covering the entire geographic region served by the system or the celestial wireless communication system may be designed such that it produces multiple overlapping or non-overlapping beams that serve different sub-regions of the entire geographic region served by the celestial wireless communications system. The satellites and the respective sub-regions may serve a function similar to that of the base stations 30*a-d* and the associated cells 1-4 of the communications network 10.

Although the invention is disclosed herein with reference to radiotelephones, it will be understood that the invention can be practiced in any type of electronic device that uses a removable SIM card to register with a communications network. For example, the invention can be practiced in, among other things, a single or dual mode mobile cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance all of which include a radiotelephone transceiver.

Embodiments according to the invention can allow data to be transferred from (or to) an electronic device when a removable Subscriber Identity Module (SIM) card that stores information used to register the electronic device with a communications network is absent from the electronic device. A subscriber may, therefore, upgrade from an existing radiotelephone to a new radiotelephone without the need for two SIM cards so that both radiotelephones operate to transfer the data. For example, according to embodiments of the invention, a subscriber can transfer data from the existing radiotelephone to the new radiotelephone even though one of the radiotelephones does not have a SIM card. Data, such as contact information, that is not stored on the SIM card may, therefore, be more easily migrated to the new radiotelephone.

In contrast, conventional approaches may not allow a radiotelephone without a SIM to receive or transmit the data as conventional radiotelephones may not operate without a SIM card present in the radiotelephone. Instead, the conventional approach may require the subscriber to manually enter any data that is not stored on the SIM into the new radiotelephone.

FIG. 1 is a diagram that illustrates a wireless communications network 10 that supports GSM type communications in which radiotelephones 20a-d according to the invention can be used. Networks 10 are commonly employed to provide voice and data communications to subscribers using, for example, the standards discussed above.

It will be understood that the term "transferring" as described herein can include transmitting/receiving data to/from an electronic device to/from another electronic device. It will be further understood that the transfer of data can be made between dissimilar electronic devices, such as between a radiotelephone and a headphones where the data takes the form of audio information when the radiotelephone plays an audio file so that it may be heard via the headphones when the SIM card is absent from the electronic device. It will also be understood that the transfer of data can include the transfer of user selectable data from the memory of the radiotelephone to the display of the radiotelephone so that, for example, the radiotelephone may be used to view images/video when the SIM card is absent from the electronic device. In particular, the user may select which audio or video data is to be transferred by, for example, selecting the user selectable data from a menu provided on the display of the electronic device.

According to FIG. 1, a plurality of radiotelephones 20a-d can communicate with each other and other terminals, such as terminals 26, 28, via the network 10 and a Public Service Telephone Network (PSTN) 14. The wireless communications network 10 is organized as cells 1-4 that collectively can provide service to a geographic region. In particular, each of the cells can provide service to associated sub-regions included in the geographic region covered by the network 10. More or fewer cells can be included in the network 10, and the coverage area for the cells 1-4 may overlap. Each of the cells 1-4 may include an associated base station 30a-d. The base stations 30a-d can provide wireless communications between each other and the radiotelephones 20a-d in the associated geographic region to allow for communications between the radiotelephones 20a-d and/or the terminals 26, 28 in the PSTN 14.

Each of the base stations 30a-d can transmit/receive data to/from the radiotelephones 20a-d over an associated control channel 22a-d. For example, the base station 30a in cell 1 can communicate with the radiotelephone 20a over the control channel 22a. The control channel 22a can be used to page the radiotelephone 20a in response to calls directed thereto or to transmit traffic channel assignments to the radiotelephone 20a over which a call associated therewith is to be conducted. The control channels 22a-d can be identified using control channel numbers or identifiers. For example, the radiotelephone 20a can store a channel number that identifies control channel 22a as the control channel on which it is currently camping.

The radiotelephones 20a-d are configured to register with the network 10 when, for example, the radiotelephones are turned on. In particular, the radiotelephones 20a-d use information, stored on a SIM card in the respective radiotelephone, to register with the network 10. Once the radiotelephones 20a-d are registered with the network 10, the radiotelephones 20a-d can receive service from the wireless communications network 10, such as placing and receiving calls via the wireless communications network 10 as the radiotelephones 20a-d move with the geographic region serviced by the network 10.

Figure 2:
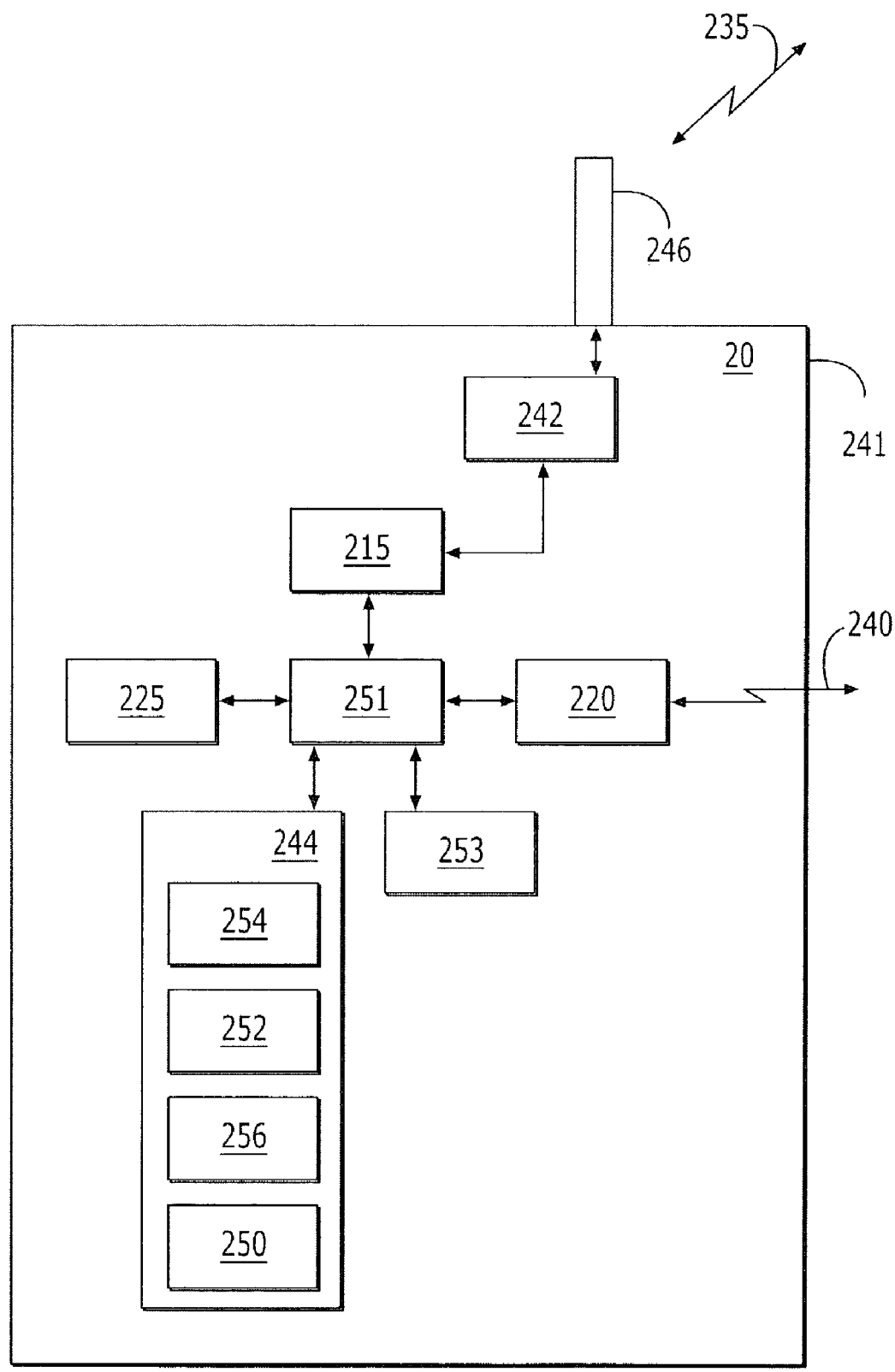
FIG. 2 is a block diagram illustrating embodiments of mobile cellular radiotelephones according to the invention.

FIG. 2 is a block diagram that illustrates embodiments of radiotelephones 20 according to the invention. As illustrated in FIG. 2, the radiotelephone 20 includes a transceiver circuit 242 that is operative to transmit and receive radio frequency communication signals to the network 10 via an antenna system 246. The antenna system 246 may include an antenna feed structure and one or more antennas.

As is well known to those of skill in the art, a transmitter portion of the transceiver 242 converts the information which is to be transmitted by the radiotelephone 20 into electromagnetic signals suitable for radio communications. A receiver portion of the transceiver 242 demodulates electromagnetic signals which are received by the radiotelephone 20 from the network 10 to provide the information contained in the signals in a format which is understandable to the user.

A user interface 244 of the radiotelephone 20 may include a variety of components, such as a display 254, a keypad 252, a speaker 256, and a microphone 250, operations of which are known to those of skill in the art. It will be understood that the functions of keypad 252 and the display 254 can be provided by a touch screen through which the user can view information, such as computer displayable documents, provide input thereto, and otherwise control the radiotelephone 20. It will be understood by those skilled in the art that computer displayable documents (or Web pages) can be, for example, hypertext documents which can include text, images, input fields, output fields, and a variety of other objects.

A processor circuit 251 provides for overall operation of the radiotelephone 20 including coordination of communications via the transceiver circuit 242, the user interface 244, and other components and systems included in the radiotelephone 20. For example, the processor circuit 251 can provide communications signals to the transceiver 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit which is not shown.

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP).

The processor circuit 251 may provide digital signal processing operations such as scanning for an acceptable control channel, camping on a control channel (including maintaining synchronization with the base station that communicates with the radiotelephone 20), Voice Activated Dialing (VAD) services, performing media operations and the like. The media operations performed by the radiotelephone 20 can include executing MP3 and/or MPEG objects such as a single file or a collection of files. For example, the processor circuit 251 can play audio by decompressing and playing an MP3 formatted object through the speaker 256 or by decompressing and displaying an MPEG formatted image on the display 254.

A memory 253 can store computer program instructions that, when executed by the processor circuit 251, carry out the operations described herein and shown in the figures. The memory 253 can also store data that is transferred by the radiotelephone according to embodiments of the invention that, for example, is not stored on the SIM card because the "excess" data exceeds the storage capacity of the SIM card. The data stored in the memory 253 can include, for example, contact information, schedule information, to-do information, e-mail information, web information, image information, audio information, video information and the like. The memory 253 can be non-volatile memory, such as EEPROM (or flash memory), that retains the stored data while power is removed from the memory 253.

The radiotelephone 20 includes a removable SIM card 225. The SIM card 225 can be installed (or removed) from the radiotelephone 20 by inserting (or removing) the SIM card 225 into/from a SIM card holder. The SIM card 225 stores information, such as an International Mobile Subscriber Identity (IMSI) that identifies the subscriber to the network 10 and a secret key for authentication. In some embodiments according to the invention, the IMSI includes a 3-digit Mobile Country Code (MCC) which identifies the country and a 2-digit Mobile Network Code (MNC) which identifies the network within that country. It will be understood that the SIM card 225 can store other types of data, such as user defined data. Data stored on the SIM card 225 may be encrypted using, for example, the Public Key Cryptography standard.

The processor circuit 251 can use the IMSI on the SIM card 225 to register the radiotelephone 20 with the network 10 so that the radiotelephone 20 can receive service from the network 10. The SIM card 225 can provide personal mobility, so that the user can have access to subscribed services irrespective of the specific radiotelephone into which the SIM card 225 is inserted. In particular, by removing the SIM card 225 from an existing radiotelephone and inserting the SIM card 225 into a new radiotelephone, the user is able to receive calls, place calls, and receive other subscribed services via the new radiotelephone, which may have improved performance compared to the existing radiotelephone. In some embodiments according to the invention, the SIM card 225 may also include a Wireless Application Protocol (WAP) identity module that provides an interface for services relating to wireless Internet as well as data storage services.

A registration circuit 215, in coordination with the processor circuit 251, performs functions for registration of the radiotelephone 20 with the network 10 so that the radiotelephone 20 can receive service from the network 10. In particular, the registration circuit 215, among other functions, provides the IMSI to the communications network 10 over a communications channel 235. It will be understood that some or all of the functions provided by the registration circuit 215 can be implemented by the portions of the processor circuit 251 by, for example, executing stored program instructions.

According to embodiments of the invention, if the SIM card 225 is absent from the radiotelephone 20, the registration circuit 215, under the control of the processor circuit 251, will not register the radiotelephone 20 with the network 10. In some embodiments according to the invention, the data can be transferred while a SIM that stores information other than that used to register the electronic device with the communications network is present in the electronic device. It will be understood that, as used herein, the phrase "absent from" can refer to the information used by the radiotelephone to otherwise register with the network. Therefore, embodiments of radiotelephones according to the invention can be provided where a SIM card dummy can be present in the radiotelephone, where the SIM card dummy does not include the information used to register the radiotelephone with the network 10.

A data transfer circuit 220 transfers data from/to the radiotelephone 20 under the control of the processor circuit 251 over a communications link with another device, such as a new radiotelephone. For example, data stored on the SIM card 225 or data stored in the memory 253 can be transferred to the new radiotelephone via the data transfer circuit 220. The data can be transferred over the communications link on a communications channel 240. It will be understood that the communications channel 240 used to transmit the data via the data transfer circuit 220 is separate from the communications channel 235 used to register the radiotelephone 20 with the network 10.

In some embodiments according to the invention, the communications link is established by the data transfer circuit 220 using a standard infrared receiver/transmitter circuit known to those skilled in the art. In some embodiments according to the invention, the communications link is established by the data transfer circuit 220 using an IEEE 802.11 compliant interface, such as an IEEE 802.11(b) or (g) interface. In some embodiments according to the invention, the communications link is established by the data transfer circuit 220 using a Universal Serial Bus (USB) interface, an audio interface, and/or an internal electronic pathway between the memory of the radiotelephone and another component of the radiotelephone, such as the screen. Other types of interfaces may be used to transfer the data on the communications link.

In some embodiments according to the invention, the communications link is established by the data transfer circuit 220 using a Bluetooth™ compliant interface. As understood by those skilled in the art, Bluetooth™ is directed to providing a relatively robust high-speed wireless connection with low-power consumption and a low-cost architecture. Bluetooth™ technology may provide a universal radio interface in the 2.45 GHz frequency band to enable portable electronic devices to connect and communicate wirelessly via short-range ad hoc networks. Bluetooth™ technology is generally targeted towards the elimination of wires, cables, and connectors between such devices and systems as cordless or mobile phones, modems, headsets, personal digital assistants (PDAs), computers, printers, projectors, and local area networks. The Bluetooth™ interface is further described in an article authored by Jaap Haartsen entitled *Bluetooth—The universal radio interface for ad hoc, wireless connectivity*, Ericsson Review, No. 3, 1998, which is hereby incorporated herein by reference in its entirety.

It will be understood that the registration circuit 215 and the data transfer circuit 220 (and other components of the radiotelephone 20) may be implemented as part of the processor circuit 251 so that the operations performed by the registration circuit 215 and the data transfer circuit 220 are performed, for example, by program instructions stored in the memory 253 and executed by the processor circuit 251. For example, the data transfer circuit 220 may be implemented as a port within the architecture of the processor circuit 251 rather than as a circuit separate from the processor circuit 251.

Figure 3:
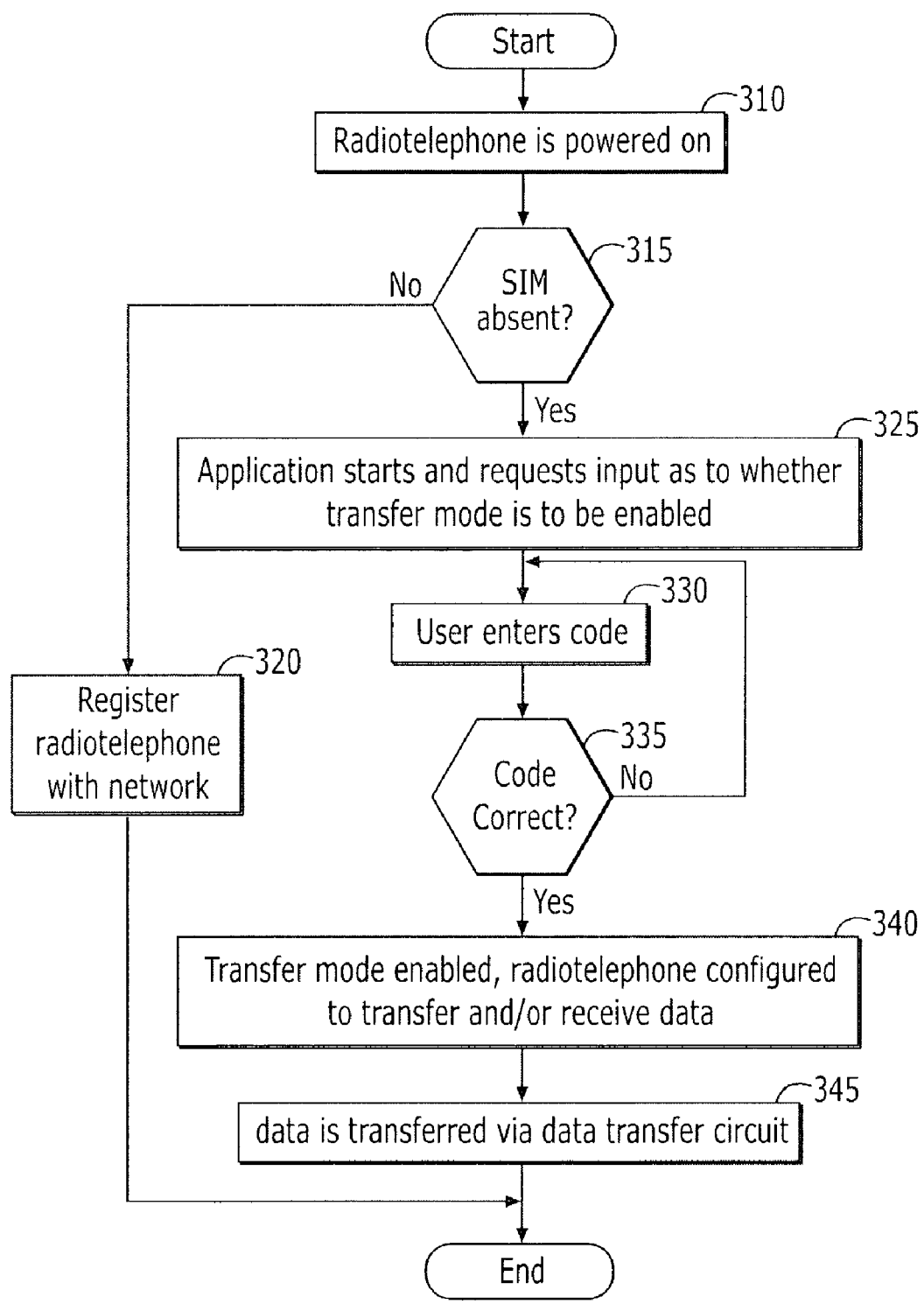
FIG. 3 is a flowchart that illustrates method embodiments of mobile cellular radiotelephones according to the invention.

FIG. 3 is a flowchart that illustrates method embodiments of radiotelephones according to the invention. In particular, the radiotelephone 20 shown in FIG. 2 is powered on (Block 310), to cause the processor circuit 215 to determine whether the SIM card 225 is present or absent from the radiotelephone 20 (Block 315). If the processor circuit 251 determines that the SIM card 225 is present in the radiotelephone 20, the processor circuit 251 causes the registration circuit 215 to register the radiotelephone 20 with the network 10 (Block 320).

If the processor circuit 251 determines that the SIM card 225 is absent from the radiotelephone 20 (Block 315), the processor circuit 251 initiates an application to determine whether a transfer mode should be enabled for the radiotelephone 20 (Block 325). Transfer mode enables data to be transferred to/from the radiotelephone 20 via the data transfer circuit 220 over the communications channel 240 when the SIM card 225 is absent from the radiotelephone 20.

The application executed by the processor circuit 251 requests input from the user to determine whether the transfer mode should be enabled, for example, by prompting the user to input a code (Block 325). In response, the user inputs a code via, for example, the keypad 252 (Block 330). The processor circuit 251 determines whether the code input by the user is correct (Block 335). If the code entered by the user in incorrect, the application blocks the transfer of data and may prompt the user to input another code or, alternatively, may terminate operations. If the code entered by the user is correct, the transfer mode is enabled, thereby allowing the radiotelephone 20 to transfer data to/from the radiotelephone 20 via the data transfer circuit 220 (Block 340). The user can then initiate the transfer of data via the data transfer circuit 220 (Block 345). Embodiments according to the invention can, therefore, be used to migrate data from an existing radiotelephone to a new radiotelephone, where at least one of the radiotelephones 20 does not include a SIM card 225. Accordingly, the data can be transferred from the memory 253 in the existing radiotelephone 20 to a respective memory in the new radiotelephone. Moreover, the amount of data to be transferred may be so large that the data cannot be stored on the SIM card 225, where, for example, the number of contacts stored in radiotelephone precludes the contacts from being stored on the SIM card as the total storage required to store the contacts may exceed the available storage of the SIM card 225.

Figure 4A:
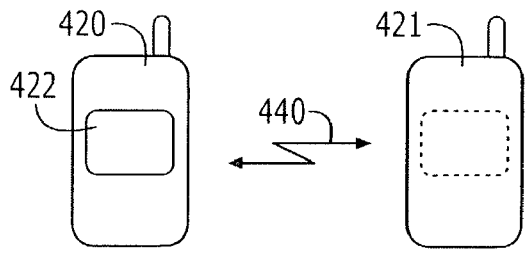
FIGS. 4A, 5A, 6A, 7A, 7B, and 8 are schematic diagrams that illustrate embodiments of data transfer according to the invention.
Figure 4B:
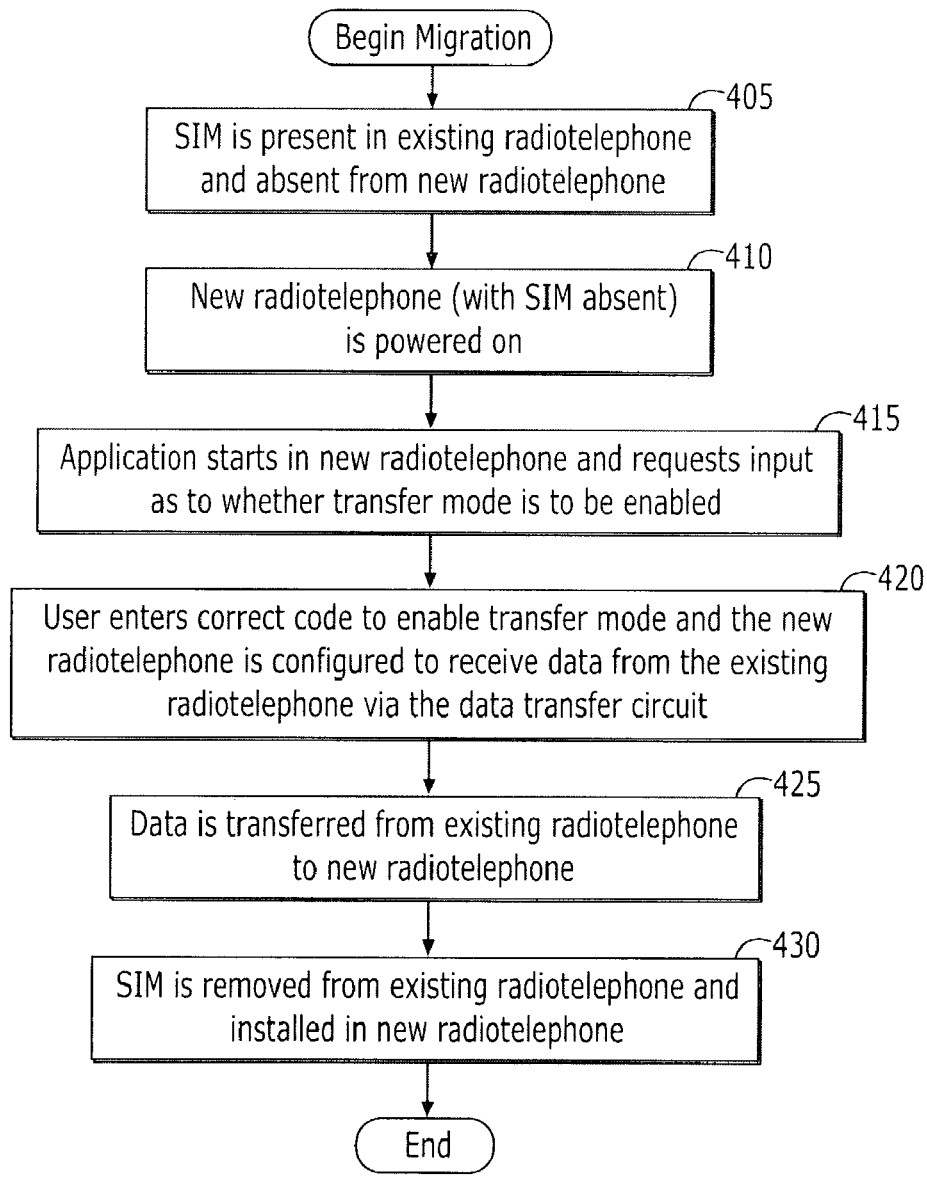
FIGS. 4B, 5B, 6B and 7C are flowcharts that illustrate method embodiments of mobile cellular radiotelephones according to the invention.

FIG. 4A is a schematic diagram that illustrates embodiments of data migration where data is transferred from an existing radiotelephone 420 to a new telephone 421 as shown in FIG. 4B. As shown in FIG. 4B, a SIM card 422 is included in the existing radiotelephone 420 whereas the new radiotelephone 421 does not include a SIM card (Block 405). To transfer the data from the existing radiotelephone 420 to the new radiotelephone 421, the new radiotelephone 421 can be powered on (Block 410).

The application starts in the new radiotelephone 421 and requests input as to whether the transfer mode is to be enabled for the new radiotelephone 421 (Block 415). The user enters the correct code to enable the transfer mode to configure the new radiotelephone 421 to receive data from the existing radiotelephone 420 over a communications channel 440 established therebetween (Block 420). The user begins the transfer of data from the existing radiotelephone 420 to the new radiotelephone 421 using, for example, a data transfer utility included with the existing radiotelephone 420 (Block 425). The SIM card 422 is removed from the existing radiotelephone 420 and inserted into the new radiotelephone 421, thereby completing the data migration form the existing radiotelephone 420 to the new radiotelephone 421 (Block 430). It will be understood that the order of the actions associated with some of the blocks in FIG. 4B can be different in other embodiments. For example, in some embodiments according to the invention, the existing radiotelephone 420 can be powered on before the new radiotelephone 421.

Figure 5A:
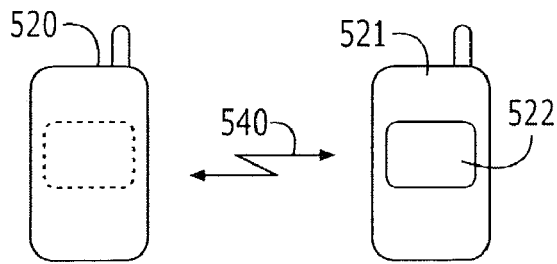
Figure 5B:
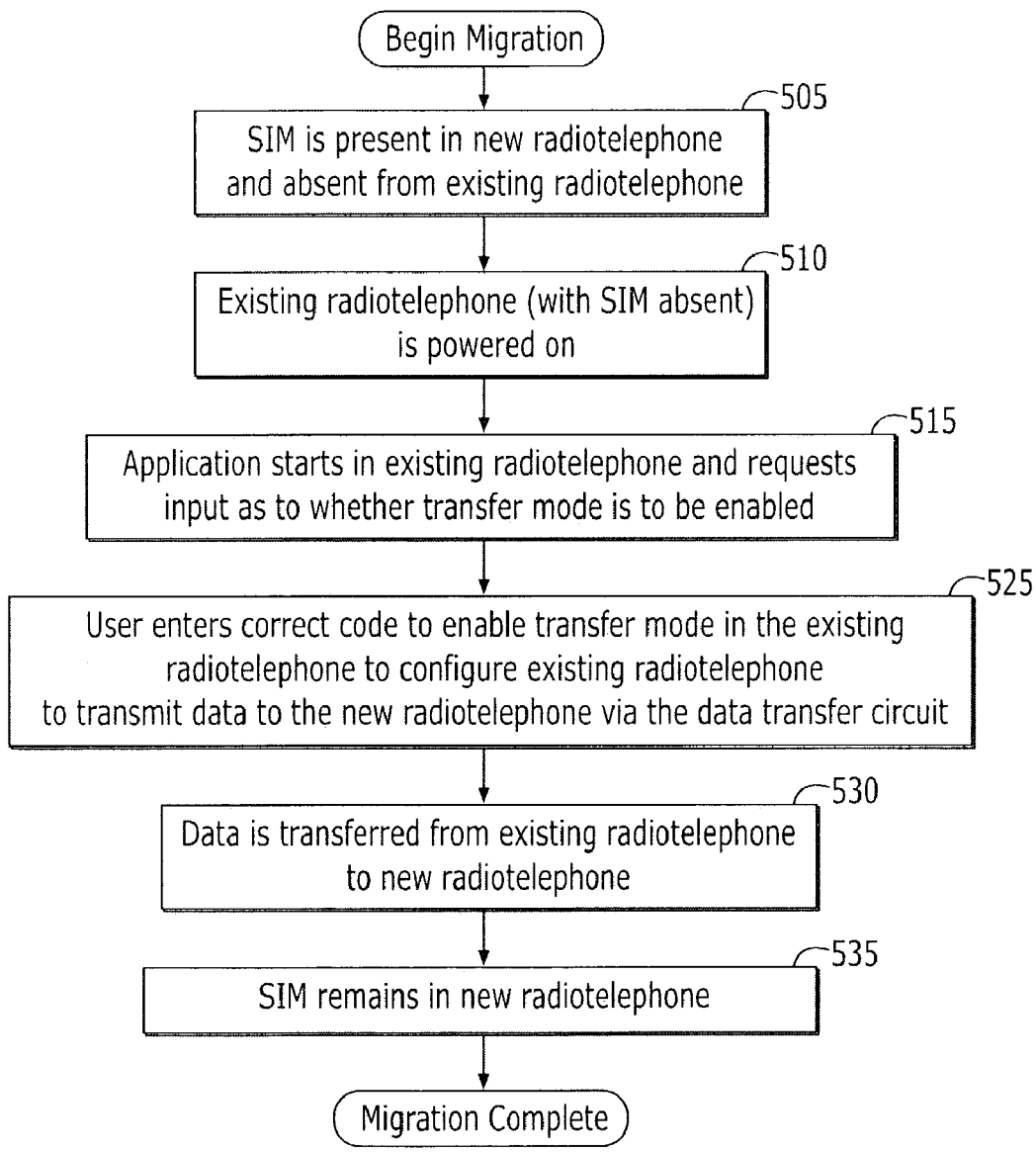

FIG. 5A is a schematic diagram that illustrates embodiments of data migration from an existing radiotelephone 520 to a new radiotelephone 521. FIG. 5B is a flowchart that illustrates method embodiments of the data migration situation illustrated in FIG. 5A. As shown in FIG. 5B, a SIM 522 is present in the new radiotelephone 521, whereas a SIM card is absent from the existing radiotelephone 520 (Block 505). The user powers on the existing radiotelephone 520 (Block 510), whereupon an application (to transfer data) starts and requests input as to whether the transfer mode is to be enabled in the existing radiotelephone 520 (Block 515). The user enters the correct code to configure the existing radiotelephone 520 to transmit data to the new radiotelephone 521 over a communications channel 540 via the data transfer circuit (Block 525). Data is then transferred from the existing radiotelephone 520 to the new radiotelephone 521 over the communications channel 540 (Block 530). The SIM card 522 remains in the new radiotelephone 521 to complete the data migration process (Block 535). It will be understood that the order of the actions associated with some of the blocks in FIG. 5B can be different in other embodiments. For example, in some embodiments according to the invention, the new radiotelephone 521 can be powered on before the existing radiotelephone 520.

Figure 6A:
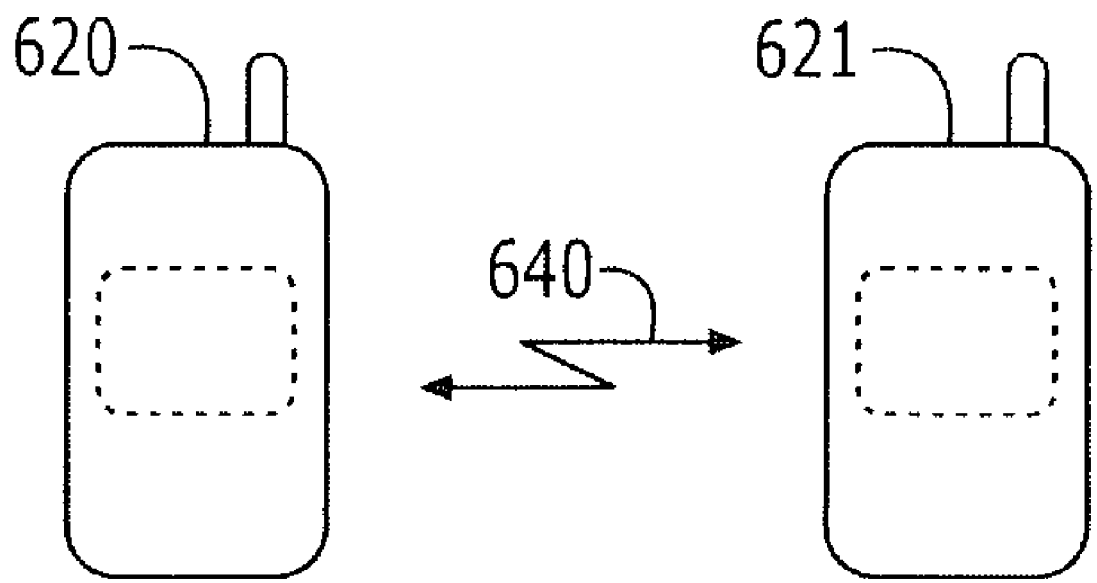
Figure 6B:
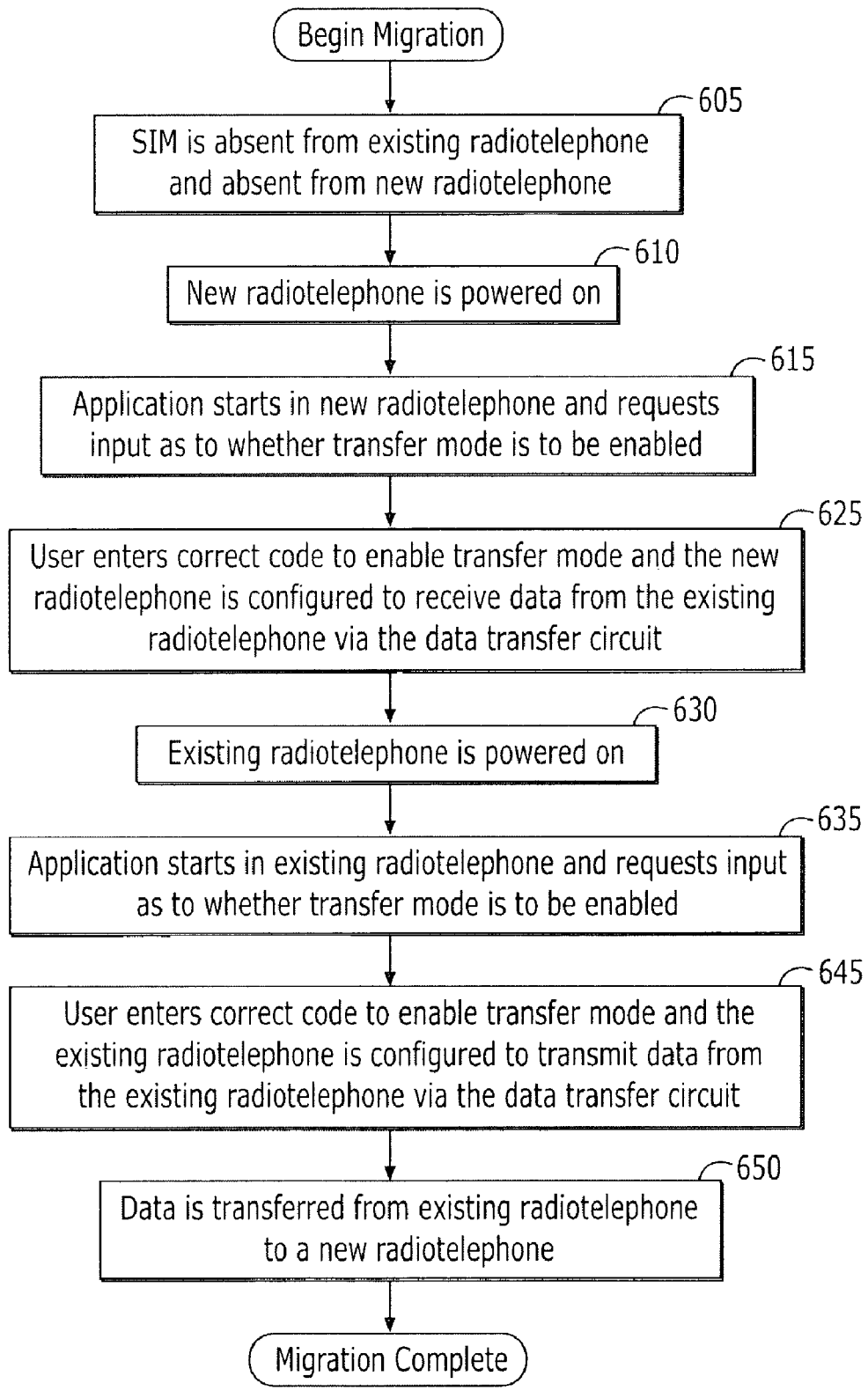

FIG. 6A is a schematic diagram illustrating embodiments of data migration where neither an existing radiotelephone 620 nor a new radiotelephone 621 includes a SIM card. FIG. 6B is a flowchart that illustrates method embodiments of the migration situation illustrated in FIG. 6A. As shown in FIG. 6B, a SIM is absent from both the existing radiotelephone 620 and the new radiotelephone 621 (Block 605). The user powers on the new radiotelephone (Block 610), whereupon the application starts and requests that user input the code to enable the transfer mode in the new radiotelephone 621 (Block 615). The user enters the correct code to enable the transfer mode to allow the new radiotelephone 621 to receive data from the existing radiotelephone 620 via the data transfer circuits of the respective radiotelephones (Block 625).

The existing radiotelephone 620 is powered on (Block 630), whereupon the application starts therein and requests input as to whether transfer mode is to be enabled for the existing radiotelephone 620 (Block 635). The user enters the correct code to enable the transfer mode to allow the transmission of data from the existing radiotelephone 620 to the new radiotelephone 621 (Block 645), whereupon the data is transferred from the existing radiotelephone 620 to the new radiotelephone 621 (Block 650). It will be understood that the order of the actions associated with some of the blocks in FIG. 6B can be different in other embodiments. For example, in some embodiments according to the invention, the order in which the radiotelephones are powered on can be the reverse of that described above.

Figure 7A:
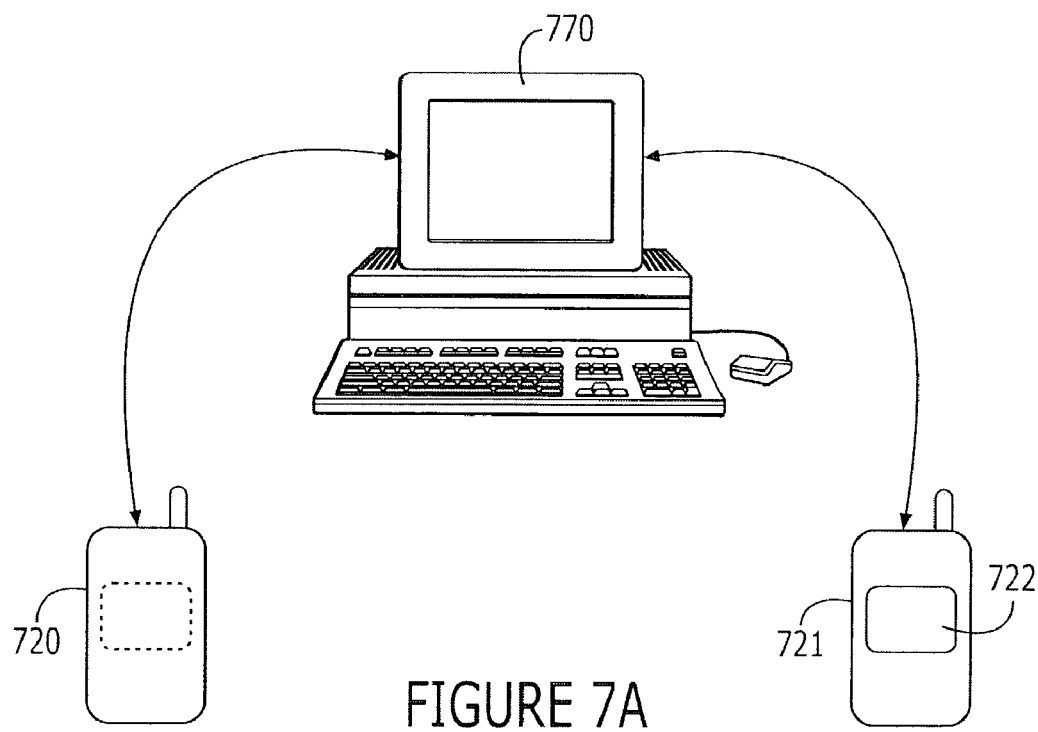

FIG. 7A is a schematic diagram illustrating embodiments of data migration from an existing radiotelephone 720 to a new radiotelephone 721 via a general purpose personal computer (PC) 770. In particular, the PC 770 can provide for the transfer of the data between the radiotelephones. Accordingly, a computer program product according to the invention may be configured to run on the PC 770 and may be configured to transfer the data from the radiotelephone 720 where a SIM card is absent therefrom and is present in the new existing radiotelephone 721.

Figure 7B:
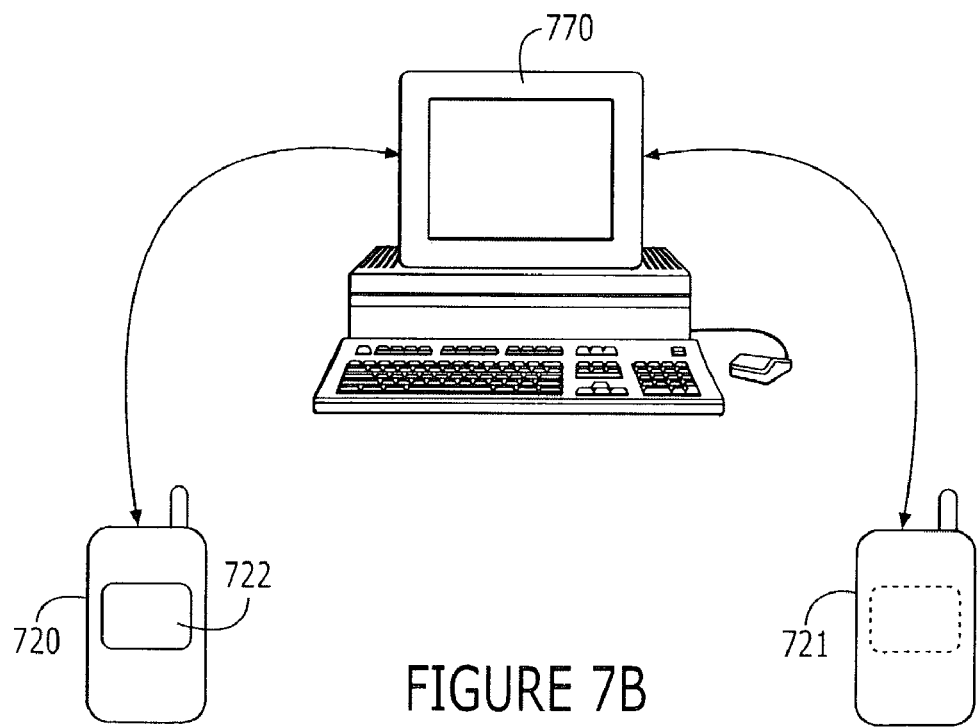

FIG. 7B is a schematic diagram illustrating embodiments of data migration from the existing radio telephone 720 to the new radio telephone 721 via the general purpose computer (PC 770). In particular, the PC 770 can provide for the transfer of the data from the existing radio telephone 720 to the new radio telephone 721 via the PC 770 wherein the SIM card 722 is present in the existing radio telephone 720 and is absent from the new radio telephone 721.

Figure 7C:
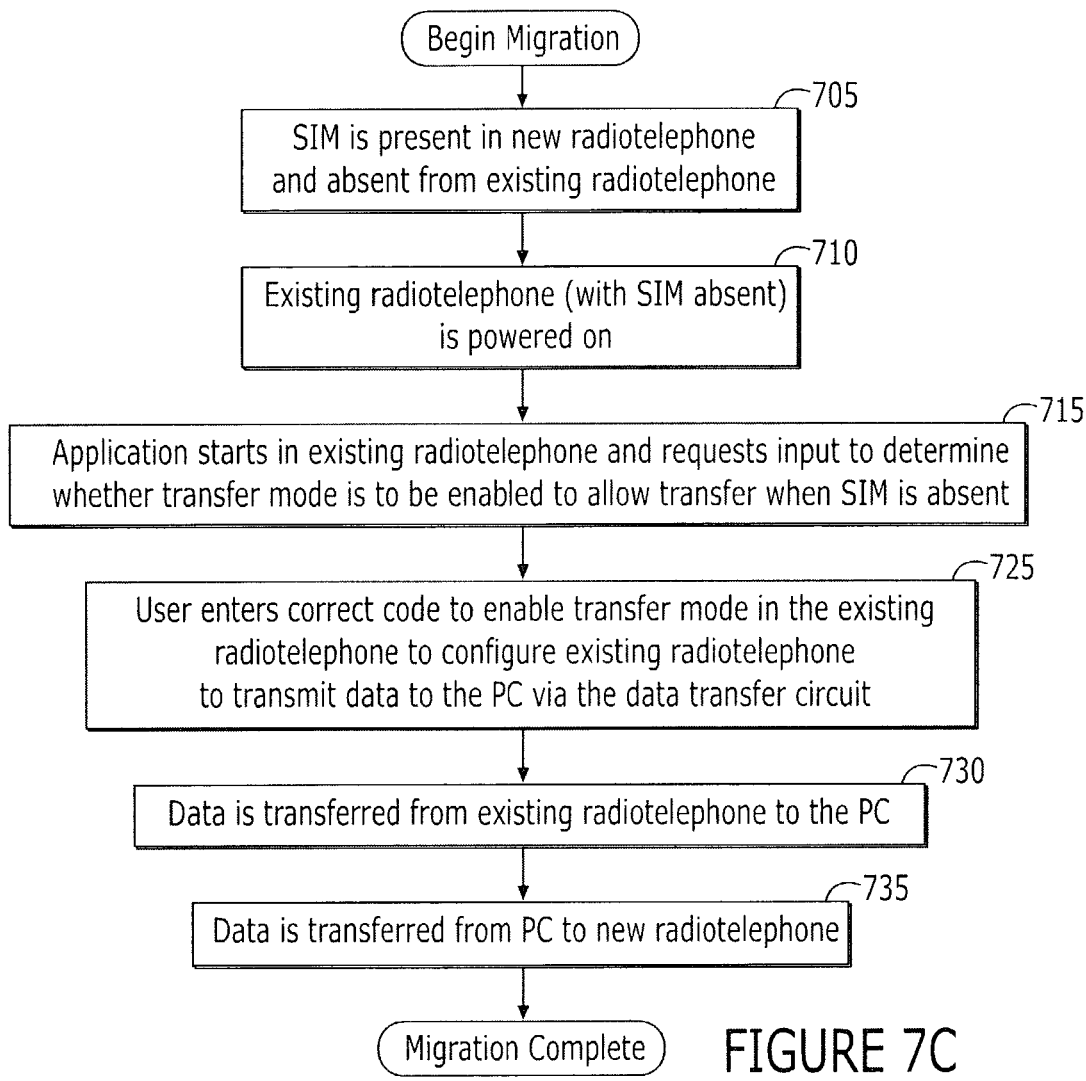

FIG. 7C is a flowchart that illustrates method embodiments of data migration shown in FIG. 7A. As shown in FIG. 7C, a SIM card 722 is present in the new radiotelephone 721 and absent from the existing radiotelephone 720 (Block 705). The existing radiotelephone 720 is powered on (Block 710), whereupon the application starts and requests input to determine whether the transfer mode is to be enabled in the existing radiotelephone 720 (Block 715). The user enters the correct code to enable the transfer mode in the existing radiotelephone 720 to configure the transfer of data from the existing radiotelephone 720 to the PC 770 (Block 725). Data is transferred from the existing radiotelephone 720 to the PC 770 (Block 730), using a computer program running on the PC 770, which then transfers the data to the new radiotelephone 721 (Block 735).

The PC 770 can be a general purpose personal computer capable of running a wide range of applications software and may consist of a CPU, a memory, a network communications device, a hard disk drive, a keyboard, a monitor and other hardware and software components commonly found in personal computers. For example, the PC 770 may be implemented using a Pentium microprocessor marketed by Intel running a Windows Operating System marketed by Microsoft Inc.

Figure 8:
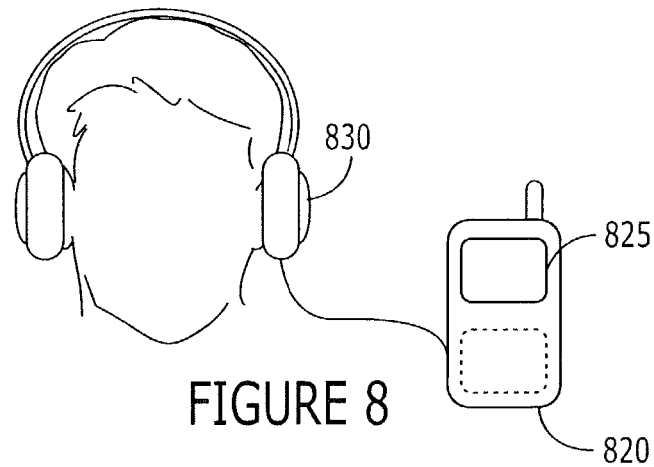

FIG. 8 is a schematic diagram that illustrates the transfer of data from a radiotelephone 820 to a headphone 830 and/or to a display 825 of the radiotelephone 820. According to embodiments of the invention, a SIM card used to register the radiotelephone 820 with a communications network is absent from the radiotelephone 820. According to FIG. 8, a user may access audio or video data that is stored in a memory of the radiotelephone 820 when the SIM card is absent. In particular, data can be transferred over an audio interface from the radiotelephone 820 to the headphones 830. Furthermore, in some embodiments according to the invention, data stored in the memory of the radiotelephone 820 can be transferred from the memory to a display 825 of the radiotelephone 820 when the SIM card is absent therefrom. Accordingly, the user may view selectable images and/or video data stored in the memory of the radiotelephone when the SIM card is absent.

As discussed above, embodiments according to the invention can allow data to be transferred from/to an electronic device when a removable Subscriber Identity Module (SIM) card that stores information used to register the electronic device with a communications network is absent from the electronic device. A subscriber may, therefore, upgrade from an existing radiotelephone to a new radiotelephone without the need for two SIM cards so that both radiotelephones operate to transfer the data. For example, according to embodiments of the invention, a subscriber can transfer data from the existing radiotelephone to the new radiotelephone even though one (or both) of the radiotelephones does not have a SIM card. Data, such as contact information, that is not stored on the SIM card may, therefore, be more easily migrated to the new radiotelephone.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of transferring data comprising:
   transferring data from/to an electronic device when information used to register the electronic device with a wireless communications network is absent from the electronic device;
   determining that a SIM used to store the information is absent from the electronic device; and
   determining if a user selectable transfer mode for the device is enabled to allow transferring data while the SIM is absent from the electronic device.

2. A method according to claim 1 further comprising:
   transferring data if the transfer mode is enabled and blocking transferring data if the transfer mode is disabled.

3. A method according to claim 1 wherein the step of determining if a transfer mode is enabled comprises:
   requesting input to the electronic device;
   receiving input to the electronic device via an input device associated with the electronic device; and
   determining if the received input enables transfer mode.

4. A method according to claim 1 wherein the step of transferring comprises transferring the data using a first communications channel that is separate from a second communications channel used to register the electronic device with the communications network.

5. A method according to claim 4 wherein the first communications channel is carried over at least one of an infrared communications link, a BlueTooth communications link, a USB interface, and an IEEE 802.11 communications link.

6. A method according to claim 1 wherein the electronic device comprises a mobile cellular radiotelephone configured to register in a Global System for Mobile telecommunications compliant communications network.

7. A method according to claim 1 wherein the electronic device comprises a first electronic device, the method further comprising:
   determining, in the first electronic device, that a SIM used to store the in formation is absent therefrom:
   determining if a transfer mode is enabled for the first electronic device to allow the transfer of data from/to a second electronic device while the SIM is absent; and
   transferring data from the first electronic device or receiving data from the second electronic device responsive to determining that the transfer mode is enabled for the first electronic device.

8. A method according to claim 7 wherein a second SIM that stores information used to register the second electronic device with the communications network is absent from the second electronic device while transferring data.

9. A method according to claim 1 further comprising:
   transferring the data while a SIM that stores information other than that used to register the electronic device with the communications network is present in the electronic device.

10. A method according to claim 1 wherein the data comprises data stored in non-volatile memory of the electronic device.

11. A method according to claim 10 wherein the data comprises at least one of contact information, schedule information, to-do information, e-mail information, web information, image information, audio information, and video information.

12. A method according to claim 10 wherein the data comprises excess data having a size that exceeds an unused storage capacity of the a SIM.

13. A method according to claim 1 wherein the electronic device comprises a unitary mobile cellular radiotelephone.

14. An electronic device for transferring data comprising:
a processor circuit configured to allow transfer of data from/to the electronic device when information used to register the electronic device with a wireless communications network is absent from the electronic device, wherein the processor circuit is further configured to allow transfer of data if a user selectable transfer mode for the device is enabled and a SIM used to store the information is absent and to block the transfer of data if the transfer mode is disabled.

15. An electronic device according to claim 14 wherein the processor circuit is configured to determine whether a SIM used to store the information is present or absent from the electronic device, the electronic device further comprising:
a registration circuit configured to register the electronic device with the communications network responsive to the processor circuit determining that the SIM is present; and
a data transfer circuit configured to transfer data from/to the electronic device responsive to the processor circuit determining that the SIM is absent and a transfer mode is enabled to allow transferring data while the SIM is absent.

16. An electronic device according to claim 15 wherein the processor circuit is further configured to:
request an input;
receive input via an input device associated with electronic device; and
determine if the received input enables transfer mode.

17. An electronic device according to claim 15 wherein the data transfer circuit is configured to transfer the data using a first communications channel; and
wherein the registration circuit is configured to register the electronic device with the communications network using a second communications channel that is separate from the first communications channel.

18. An electronic device according to claim 17 wherein the first communications channel is carried over at least one of an infrared communications link a BlueTooth communications link, a USB interface, and an IEEE 802.11 communications link.

19. An electronic device according to claim 14 wherein the electronic device comprises a mobile cellular radio telephone configured to register in a Global System for Mobile telecommunications compliant communications network.

20. An electronic device according to claim 14 wherein the electronic device comprises a first electronic device, the processor circuit is further configured to:
determine, in the first electronic device, that a SIM used to store the in formation is absent therefrom;
determine if a transfer mode is enabled for the first electronic device to allow the transfer of data from/to a second electronic device while the SIM is absent; and
transfer data from the first electronic device or receiving data from the second electronic device responsive to determining that the transfer mode is enabled for the first electronic device.

21. An electronic device according to claim 20 wherein a second SIM that stores information used to register the second electronic device with the communications network is absent from the second electronic device.

22. An electronic device according to claim 14 wherein the processor circuit is further configured to allow transfer the data while a SIM that stores information other than that used to register the electronic device with the communications network is present in the electronic device.

23. An electronic device according to claim 14 further comprising:
a non-volatile memory configured to store the data outside a SIM used to store the information.

24. An electronic device according to claim 23 wherein the data comprises at least one of contact information, schedule information, to-do information, e-mail information, web information, image information, audio information, and video information.

25. An electronic device according to claim 23 wherein the data comprises excess data having a size that exceeds an unused storage capacity of the SIM.

26. An electronic device according to claim 14 wherein the electronic device comprises a unitary mobile cellular radiotelephone.

27. An electronic device for transferring data comprising:
a processor circuit configured to allow transfer of user selectable data from a memory of an the electronic device to an output therefrom when information used to register the electronic device with a wireless communications network is absent from the electronic device, wherein the processor circuit is further configured to allow the transfer of the user selectable data if a user selectable transfer mode for the device is enabled and a SIM used to store the information is absent from the device and to block the transfer of data if the transfer mode is disabled.

28. An electronic device according to claim 27 wherein the user selectable data comprises at least one of audio information transferred to headphones coupled to the electronic device and video or image data transferred to a display of the electronic device that is selected by a user.

29. A computer program product for transferring data from/to an electronic device, comprising:
a computer readable medium having computer readable program code embodied therein, the computer readable program code comprising:
computer readable program code configured to transfer data from/to the electronic device when information used to register the electronic device with a wireless communications network is absent from the electronic device, wherein the computer readable program code is further configured to allow transfer of the data if a user selectable transfer mode for the device is enabled and a SIM used to store the information is absent from the device and to block the transfer of data if the transfer mode is disabled.

30. A method of transferring data from/to an electronic device comprising:
transferring data from/to a first electronic device to/from a second electronic device when a removable Subscriber Identity Module (SIM) that stores information used to register the first electronic device with a wireless communications network is absent from the first electronic device, wherein the first and second electronic devices are associated with a common subscriber to the wireless communications network, wherein the transfer of data is allowed if a user selectable transfer mode for the first electronic device is enabled and a SIM used to store the information is absent therefrom and the transfer of data is blocked if the transfer mode for the first electronic device is disabled.

31. A method according to claim 30 further comprising:
  determining that the SIM is absent therefrom; and
  determining if a transfer mode is enabled for the first electronic device to allow transferring data from/to a second electronic device while the SIM is absent from the first electronic device; and
  transferring data from the first electronic device or receiving data from the second electronic device responsive to determining that the transfer mode is enabled for the first electronic device.

32. A method according to claim 31 wherein determining if a transfer mode is enabled for the first electronic device comprises:
  requesting input to the first electronic device;
  receiving input to the first electronic device via an input device associated with the first electronic device; and
  determining if the received input enables transfer mode.

33. A method according to claim 30 wherein transferring comprises transferring the data between said electronic devices using a first communications channel that is separate from a second communications channel used to register the electronic device with the wireless communications network.

34. A method according to claim 33 wherein the first communications channel is carried over at least one of an infrared communications link, a BlueTooth communications link, a USB interface, and an IEEE 802.11 communications link.

35. A method according to claim 30 wherein the first electronic device comprises a mobile cellular radiotelephone configured to register in a Global System for Mobile telecommunications compliant communications network.

36. A method according to claim 35 wherein a second SIM that stores information used to register the second electronic device with the communications network is absent from the second electronic device while transferring data.

* * * * *

UNITED STATES PATENT AND TRADEMARK OFFICE
CERTIFICATE OF CORRECTION

PATENT NO.        : 7,729,725 B2                                      Page 1 of 1
APPLICATION NO.   : 10/617325
DATED             : June 1, 2010
INVENTOR(S)       : Stenmark It is certified that error appears in the above-identified patent and that said Letters Patent is hereby corrected as shown below:

In the Claims:
Column 12, Claim 7, Line 38: Please correct "in formation" to read -- information --

Column 13, Claim 20, Line 50: Please correct "in formation" to read -- information --

Signed and Sealed this

Sixteenth Day of November, 2010

David J. Kappos
*Director of the United States Patent and Trademark Office*